Sept. 7, 1943.  W. F. BUSSE  2,328,614
RESILIENT MOUNTING AND METHOD OF MAKING THE SAME
Filed Feb. 10, 1940
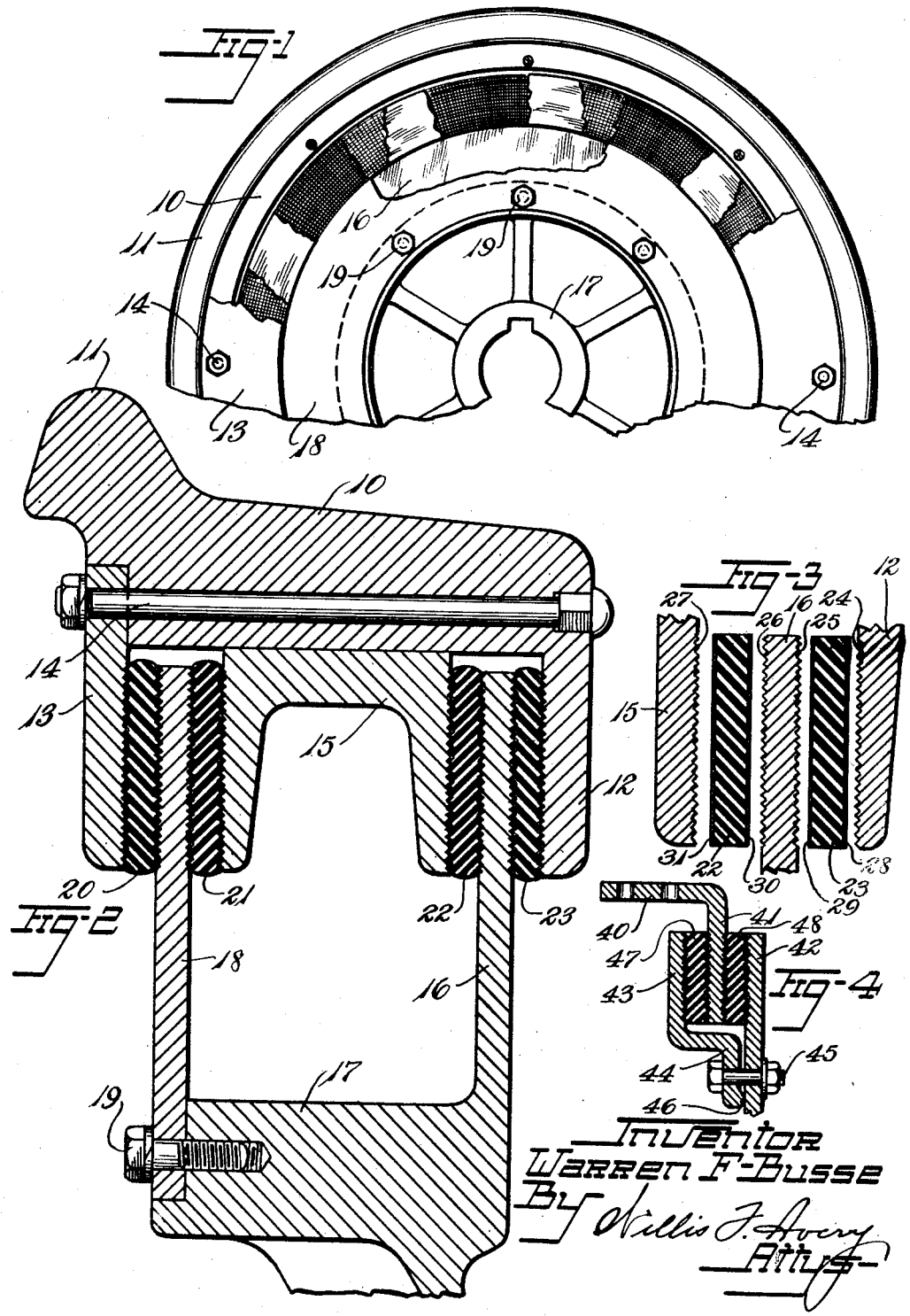
Inventor
Warren F. Busse
By Willis F. Avery
Attys Patented Sept. 7, 1943

2,328,614

UNITED STATES PATENT OFFICE 2,328,614

RESILIENT MOUNTING AND METHOD OF MAKING THE SAME

Warren F. Busse, Akron, Ohio, assignor to The B. F. Goodrich Company, New York, N. Y., a corporation of New York Application February 10, 1940, Serial No. 318,339

7 Claims. (Cl. 29—84)

This invention relates to resilient mountings and to methods of making the same. The invention is useful in mountings subjected to stresses tending to cause relative slippage between the resilient material and the connected members, and it is applicable especially to mountings in which resilient material resists relative movement of the parts by shear stress of the material.

It is often desirable in resilient mountings to provide an attachment between resilient rubber-like material and metal connecting parts that will resist high shearing forces, when it is inconvenient or impracticable actually to vulcanize the rubber-like material directly to the supporting parts because of the size or shape of the parts, or because of the nature of the material of which they are composed. Also, the vulcanizing of the rubber-like material directly to such parts involves a considerable mold expense which it is desirable to lessen or avoid. In some cases heretofore, adhesives not subject to vulcanization have been proposed to unite the rubber-like material directly to the parts, but the results with such expedients have not been wholly satisfactory because of the low strength of the attachment, particularly when the mounting has been subjected to elevated temperatures.

In some cases it has been proposed to mount an unadhered body of rubber-like material under compression directly against the supporting parts with a view toward eliminating the adhesive or bond. In some cases, even when the faces of the parts have been roughened to increase the surface friction for resisting slippage between the soft rubber-like material and the hard supporting surface, the results have not been completely satisfactory because the high degree of compression required to limit slippage has at times necessitated very heavy metal parts to withstand the high compressive stresses. In addition the slight relative motion of the metal and the edge of the rubber sometimes has caused the rubber to become "chewed up" at the outer edge, particularly in rotating parts, this condition then travelling progressively toward the center, reducing the bonded area until complete failure occurred.

The chief objects of the invention are to provide for security of attachment of the resilient material to the supporting parts, while avoiding the difficulties hereinabove discussed with respect to prior constructions, and to provide for accomplishing this by a construction that is economical and convenient to produce.

Further objects are to eliminate the necessity for providing a vulcanized bond of the resilient material directly to the heavy mounting parts, and to avoid the necessity for very high compressive stresses on the rubber solely for the purpose of preventing slippage.

These and further objects will be apparent from the following description, reference being had to the accompanying drawing in which:

Fig. 1 is an elevation, with parts broken away, of a resilient rail wheel constructed according to and embodying the invention.

Fig. 2 is a section on an enlarged scale taken on an axial plane through the wheel of Fig. 1.

Fig. 3 is a section like Fig. 2, showing parts thereof prior to assembly, but aligned for assembly.

Fig. 4 is a vertical section of a shear mounting of the flat plate type suitable for supporting motors and other vibrating masses, constructed according to and embodying the invention.

The objects hereinabove stated are attained in accordance with the invention by the provision of a thin layer of relatively stiff material upon a face of a body of the rubber-like material, such that upon pressure of said body against the irregular face of a rigid supporting part, the thin layer will be formed with indentations complementary to the irregularities of such face, the layer being of such thinness in relation to its softness that the indentations will be formed throughout the thickness of such layer so that the irregularities will be formed at both faces of the layer. This roughened stiff surface layer will then have much more resistance to lateral motion over the supporting plate than would the rubber itself, even though the surface layer is so thin that it is easily bent normal to its surface.

With the increased strength of attachment thus provided, less compressive force on the resilient body is required than if the rubber-like material were to be compressed directly in contact with the face of the supporting part in unadhered relation. Also, manufacture is considerably simplified inasmuch as it is not necessary to vulcanize the resilient body directly to such supporting parts. The thin stiff layer at the face of the rubber-like material may be bonded thereto during the vulcanization of the rubber part, and inasmuch as this may be done in simple slab form, no elaborate or bulky molding equipment is required.

The resilient body of the mounting may be of rubber or other rubber-like material, and the thin stiff layer may be of any suitable metal, for example, copper or brass, or resinous material, such as Bakelite, or hard rubber or fibrous compositions. If desired, the outer face of the indented thin stiff layer may be coated with soft solder, glue or other adhesive to contribute to the attaching strength of the layer to the mounting part, which substances would not be effective for securing the resilient body itself directly to the mounting part.

While the invention is useful in mountings of various types whether the resilient material be adapted to support the load or resist movements by compression of such material or by shear stress therein, the invention is especially applicable to mountings wherein movements are resisted wholly by shear stresses in the rubber, in which case the strength of the attachment of the resilient material to the supporting parts is of vital importance.

In Figs. 1, 2, and 3 of the accompanying drawing, the invention is applied to a cushioned rail wheel in which the cushioning is effected by rings of rubber-like material resisting relative movement of rim and hub parts by shear stress in such rings.

The rail wheel comprises a rim 10 having a rail flange 11 and a radially inward flange 12 at one margin of the rim. At the margin of the rim axially opposite the flange 12 is disposed a radially inward flange 13 removably mounted upon the rim as by means of through-bolts 14, 14. Centrally of the rim 10 is mounted a spacing ring 15 in close engagement with the inner periphery of the rim so as to move radially therewith, but preferably slidable axially of the rim for self-equalization of compressive forces of resilient rings positioned at the two axial faces thereof.

Between the spacing ring 15 and flange 12 is positioned an overlapping flange 16 integral with a hub structure 17, the flange 16 being spaced from the parts of the rim structure to provide for relative movement both radially and axially. Between the spacing ring 15 and the rim flange 13 is mounted a hub flange 18 removably secured to the hub structure 17 as by means of stud-bolts 19, 19.

Mounted between the rim structure and the hub structure above described are four resilient rings 20, 21, 22, and 23, each of such thickness in the axial direction as to be mounted under compression between the hub and rim structures when assembled in the manner illustrated in the drawing.

The opposing faces of the flange members 12, 13, 15, 16 and 18 are formed with irregularities, preferably in the form of sharp knurling as shown at 24, 25, 26 and 27, although the irregularities may be in the form of ribs or any other suitable conformation.

Each ring of rubber-like material has adhered to its axially opposite faces thin layers 28, 29, 30, 31 of stiff material as hereinbefore described, which layers are adapted to be indented throughout their thickness upon the application of a sufficient degree of pressure against the irregularities of the flange faces. These thin, stiff facing layers are adhered to the rings of rubber-like material and preferably are molded in vulcanized adhesion therewith to provide a strong bond.

The facing layer may be of a thinness approximating writing paper thinness, or less, depending upon the material used for such layers, so that the layers will be indented throughout their thickness. In effect, the irregularities of the supporting member virtually penetrate the resilient material itself owing to the thinness of the facing layer. Even though the layers be so thin as to be ruptured by the indenting, either by simple penetration through the layers or cracking thereof into numerous pieces, the combination of the adhesion of the indented layers to the resilient body and the engagement of such layers with the irregular face greatly increases the resistance to shear stresses tending to cause slippage along the face of the support.

The parts are assembled in the relation illustrated in Fig. 3 and then are clamped together and are held in such clamped relation by bolts 14, 14 and 19, 19, whereupon the parts assume the relation as shown in Fig. 2. The arrangement is such that relative movements of the rim and hub in the radial direction are resisted and cushioned by shear stresses on the resilient rings, and relative movements axially are resisted and cushioned by compression of the rings, the rim and hub being completely insulated by the resilient material. In case an electrical connection between the rim and hub is desired, suitable flexible connectors may be provided in known manner.

Sufficient pressure in the axial direction is imposed upon the rings to cause the surface irregularities of the flange members to form indentations in the facing layers of the resilient rings, such indentations being formed throughout the thickness of such layers as shown most clearly in Fig. 2. The indented facing layers have the effect of increasing the strength against shearing forces both at the inner face of each layer that is adhered to the rubber-like material, and at its outer face in contact with the flange member, in the manner hereinabove described.

In the embodiment of Fig. 4 the invention is applied to a flat-plate shear type resilient mounting suitable for supporting engines or other vibrating masses. In this embodiment an angle bracket 40 suitable for connection with a supported structure has a depending flange 41 disposed in spaced-apart relation between side plates 42, 43, the latter plate being bent at 44 to facilitate its being bolted in clamping relation with plate 42 by means of one or more bolts 45. To facilitate alignment of plates 42, 43, the plate 43 may be provided with a ridge 46 adapted to bear against the plate 42 below the bolts 45. The plate 42 may be bolted or otherwise secured rigidly to any suitable support. In this embodiment the resilient bodies are in the form of strips or blocks 47, 48 constructed and assembled in a manner similar to the resilient elements of embodiments of Figs. 1 to 3 except, of course, that they are not annular.

Because the resilient bodies including their stiff facings are molded independently, such bodies may if desired, be molded in the form of long strips and subsequently cut into shorter pieces according to the length of the mounting desired, thus facilititating the manufacturing procedure.

Variations may be made without departing from the scope of the invention as it is hereinafter claimed.

I claim:

1. A resilient mounting comprising opposed members adapted to be mounted for movement of one with relation to the other, the inner face of at least one of said members having surface irregularities, a body of resilient rubber-like material between said members, and a thin layer of stiff material adhered to the face of said body adjacent the irregular face of the member, said layer having indentations substantially complementary to the irregularities of said face and said layer being of such thinness as to be indented throughout its thickness toward said rubber-like material as a result of having the irregularities of said face pressed into said layer.

2. A resilient mounting comprising opposed members adapted to be mounted for movement of one with relation to the other, the inner face of at least one of said members having surface irregularities, a body of resilient rubber-like material between said members, a thin layer of stiff material at the face of said body adjacent the irregular face of the member, said layer having indentations substantially complementary to the irregularities of said face, said indentations penetrating said layer in the direction of said rubber-like material and being of a depth approximately equal to the thickness of said layer and said irregularities being seated in said indentations substantially to the depth thereof, and means for holding said members in a relation to compress said body and facing layers between them.

3. A resilient mounting comprising opposed members and an interposed body of resilient rubber-like material adapted to be mounted for movement of one member with relation to the other resisted by shear stress in said body, the inner faces of said members having surface irregularities, thin facing layers of stiff material adhered to the faces of said body adjacent the irregular faces of the members, said layers having indentations complementary to the irregularities of said faces, said indentations penetrating said layer in the direction of said rubber-like material and being of a depth approximately equal to the thickness of said layer and said irregularities being seated in said indentations substantially to the depth thereof, and means for holding said members in relation to compress said body between the irregular faces while relative movement of said members is resisted by shear stress in said body.

4. The method of making a resilient mounting which comprises assembling a body of resilient rubber-like material with a thin facing layer of relatively stiff material against an irregular face of a supporting member and pressing said body and facing layer directly against the irregular face of said member to provide indentations in said layer throughout the thickness thereof substantially complementary to the irregularities of said face.

5. The method of making a resilient mounting which comprises adhering to a body of resilient rubber-like material a thin facing layer of relatively stiff material and pressing said body and layer directly against a member having surface irregularities to provide indentations in said layer throughout the thickness thereof substantially complementary to said irregularities.

6. The method of making a resilient mounting which comprises adhering to opposed faces a body of resilient rubber-like material thin facing layers of stiff material, inserting said body between opposed members having irregular opposed faces with the facing layers of said body adjacent said faces, and pressing said members toward one another causing said facing layers to be formed with indentations throughout the thickness of said layers substantially complementary to the irregularities of said faces.

7. The method of making resilient mountings which comprises molding a body of resilient rubber-like material in strip form with thin facing layers of stiff material in vulcanized adhesion with the rubber-like material, dividing said strip into shorter lengths, inserting a length thereof between opposed members having irregular opposed faces with the facing layers of said body adjacent said faces, and pressing said members toward one another causing said facing layers to be formed with indentations throughout the thickness of said layers substantially complementary to the irregularities of said faces.

WARREN F. BUSSE.